United States Patent
Mosley et al.

(10) Patent No.: US 7,428,138 B2
(45) Date of Patent: Sep. 23, 2008

(54) FORMING CARBON NANOTUBE CAPACITORS

(75) Inventors: Larry E. Mosley, Santa Clara, CA (US); James G. Maveety, San Jose, CA (US); Edward R. Prack, Phoenix, AZ (US)

(73) Assignee: Intel Corporation, Santa Clara, CA (US)

(*) Notice: Subject to any disclaimer, the term of this patent is extended or adjusted under 35 U.S.C. 154(b) by 301 days.

(21) Appl. No.: 11/244,540

(22) Filed: Oct. 6, 2005

(65) Prior Publication Data

US 2007/0242417 A1    Oct. 18, 2007

(51) Int. Cl.
*H01G 9/04* (2006.01)

(52) U.S. Cl. .................. 361/508; 361/502; 361/504; 361/512; 361/311; 361/313

(58) Field of Classification Search .......... 361/508, 361/509, 302–305, 301.1, 301.4, 301.5, 311, 361/312, 502–504, 512, 516–519
See application file for complete search history.

(56) References Cited

U.S. PATENT DOCUMENTS

| | | | |
|---|---|---|---|
| 6,665,169 B2 * | 12/2003 | Tennent et al. | 361/303 |
| 6,919,730 B2 * | 7/2005 | Cole et al. | 324/715 |
| 7,116,546 B2 * | 10/2006 | Chow et al. | 361/508 |
| 7,166,858 B2 * | 1/2007 | Wasshuber | 257/39 |
| 7,244,499 B2 * | 7/2007 | Sugiyama et al. | 428/407 |
| 2005/0145367 A1 * | 7/2005 | Hannah et al. | 165/80.3 |

OTHER PUBLICATIONS

Mosley et al., U.S. Appl. No. 11/089,922, filed Mar. 24, 2005, entitled "Capacitor with Carbon Nanotubes".

* cited by examiner

*Primary Examiner*—Nguyen T Ha
(74) *Attorney, Agent, or Firm*—Trop, Pruner & Hu, P.C.

(57) ABSTRACT

A capacitor may be formed of carbon nanotubes. Carbon nanotubes, grown on substrates, may be formed in a desired pattern. The pattern may be defined by placing catalyst in appropriate locations for carbon nanotube growth from a substrate. Then, intermeshing arrays of carbon nanotubes may be formed by juxtaposing the carbon nanotubes formed on opposed substrates. In some embodiments, the carbon nanotubes may be covered by a dielectric which may be adhered by functionalizing the carbon nanotubes.

10 Claims, 3 Drawing Sheets

FORMING CARBON NANOTUBE CAPACITORS

BACKGROUND

This invention relates generally to capacitors.

Integrated capacitors may be formed of a variety of materials. In some cases, relatively high capacitance density may be desirable. Capacitance density is generally measured as capacitance per unit area. A high capacitance density is generally one microFarad per square centimeter.

One such application is for capacitors for decoupling a power supply for integrated circuits. Such capacitors may use multilayered ceramic, aluminum polymer, and tantalum materials. Generally, aluminum and tantalum capacitors have a higher capacitance density than other capacitors. In addition, aluminum and tantalum capacitors have linear dielectric layers so there is not the large variation with electric field and temperature that ceramic capacitors may exhibit.

The greater the capacitance density, the more effective the capacitor may be for the same amount of area consumed. Thus, a higher capacitance density may result in a more densely packed semiconductor structure.

DETAILED DESCRIPTION

In accordance with some embodiments of the present invention, a capacitor may be formed with two juxtaposed substrates, one coupled to a power supply and the other coupled to ground or Vss, each substrate comprising a plurality of carbon nanotubes opposed to carbon nanotubes on the other substrate. In some embodiments, the carbon nanotubes extend transversely away from each substrate and are arranged with respect to one another in intermeshing fasion. In other words, the carbon nanotubes extend transversely to their substrates and parallel to the carbon nanotubes on the other substrate. Thus, an array of carbon nanotubes on one substrate is arranged in an interleaved fashion with carbon nanotubes of the other substrate. A capacitance is generated between opposed carbon nanotubes on different substrates. Each carbon nanotube may be covered with a dielectric in some embodiments.

Figure 1:
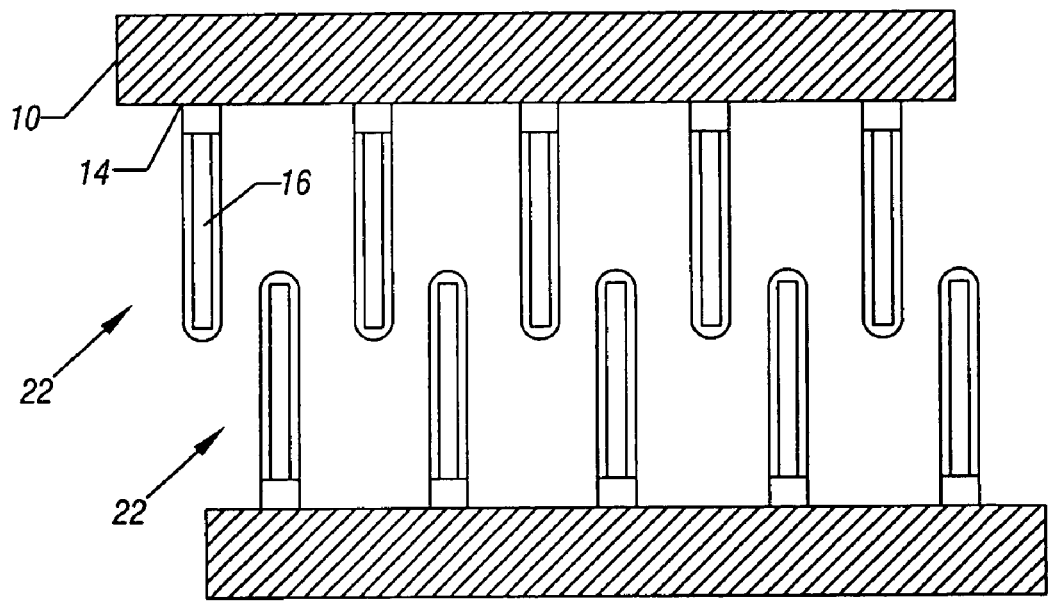
FIG. 1 is an enlarged, cross-sectional view of one embodiment of the present invention.

Referring to FIG. 1, a pair of substrates 10 may be arranged in face-to-face opposition. Each substrate 10 may have a number of outwardly extending carbon nanotube structures 22. Carbon nanotubes are graphene cylinders whose ends are closed by caps including pentagonal rings. The nanotube is a hexagonal network of carbon atoms forming a seamless cylinder. These cylinders can be as little as a nanometer in diameter with lengths of tens of microns in some cases. Depending on how they are made, the tubes can be multiple walled or single walled.

Each of the carbon nanotube structures 22 may consist of a carbon nanotube 16 covered by a dielectric coating 20. Because the carbon nanotubes 16 are highly effective conductors, a high capacitance density is developed between the opposed carbon nanotubes 22 associated with different substrates 10. Leakage current may be reduced by the presence of the dielectric coating 20.

In some embodiments, the carbon nanotubes 16 may be made at relatively low temperatures. For example, if the carbon nanotubes 16 are formed at temperatures below 350° C., the carbon nanotubes 16 may be utilized to form capacitors in standard integrated circuit structures within current parametric limitations.

In some embodiments, the large surface area of carbon nanotubes 16 provides for high capacitance density. In addition, in some embodiments, there may not be a large variation with electric field and temperature. Through the use of high dielectric constant ceramic layers for the dielectric coating 20, some of the advantages of ceramic capacitors may also be achieved in some cases.

The use of carbon nanotube arrays may result in capacitance density greater than that possible with existing technologies in some cases. Moreover, the high conductivity of carbon nanotubes makes the effective series resistance (ESR) extremely low. By controlling the location and length of the carbon nanotubes 16, capacitance may be very precisely controlled in some cases.

Figure 2:
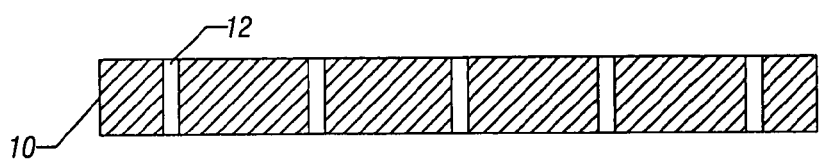
FIG. 2 is a depiction of one embodiment of the present invention at an early stage of manufacture.

Referring to FIG. 2, a substrate 10 may have an array of apertures formed therethrough. The apertures may be filled with a via plug 12. In some embodiments, the substrate 10 may be formed of polysilicon or silicon and the plug 12 may be copper. However, other substrate and plug materials may be utilized as well. In some embodiments, the plugs 12 may be made of copper formed by selective etching and sputtering.

Figure 3:
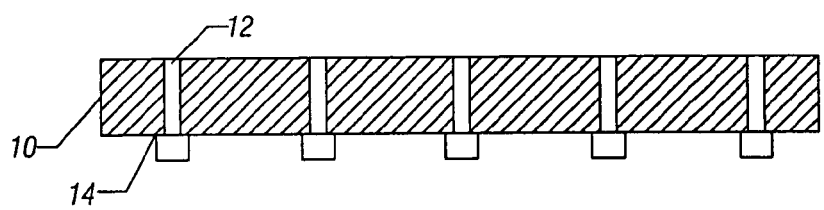
FIG. 3 is a depiction of the embodiment of FIG. 2 at a subsequent stage of manufacture.

Then, a suitable catalyst may be deposited and patterned on the lower side of the substrate 10 to form a localized area 14 as shown in FIG. 3. Suitable catalysts may include cobalt or nickel catalysts. The catalyst creates a site for the growth of carbon nanotubes 16.

Figure 4:
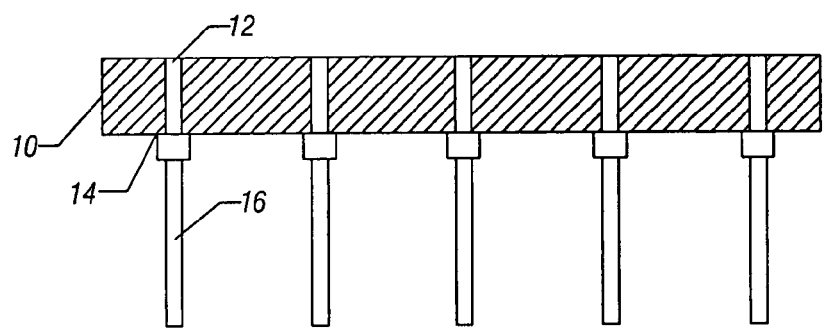
FIG. 4 is a cross-sectional depiction of the embodiment of FIG. 3 at a subsequent stage.

As shown in FIG. 4, the carbon nanotubes 16 may be grown in a plasma enhanced chemical vapor deposition chamber, for example. The carbon nanotubes 16 grow on each localized area 14 of catalyst. Thus, a pattern of carbon nanotubes may be determined by the pattern of areas 14.

Carbon nanotube patterns may vary widely. For example, regular arrays of carbon nanotubes may be created with desired spacing. Alternatively, clumps, clusters, or groups of closely spaced carbon nanotubes may be developed. The carbon nanotubes may be placed where desired by the selective imposition of the catalyst areas 14 on the substrate 10.

Thereafter, the carbon nanotubes 16 may be covered with a dielectric coating 20. The dielectric coating 20 may be silicon dioxide in one embodiment. In some cases, the dielectric coating 20 may be simply deposited, for example, using chemical vapor deposition. In some cases, the thickness of the dielectric coating 20 may be as little as one nanometer and may be controlled by the deposition process. However, in general, a dielectric coating 20, in the 5 to 10 nanometer range, may be effective to reduce the leakage current that can occur in very thin oxide layers, while still maintaining the high capacitance density.

Using the deposition method, covalent bonds in the carbon nanotube walls are not broken. Single or multi-walled carbon nanotubes may be used without losing the high electrical conductivity.

Figure 5:
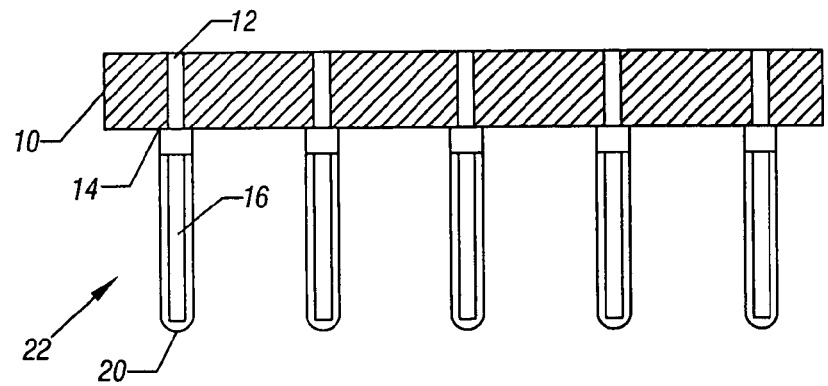
FIG. 5 is an enlarged, cross-sectional view of the embodiment of FIG. 4 at a subsequent stage.

Another method of forming the dielectric coating 20, shown in FIG. 5, is to functionalize the surface of the carbon nanotubes 16. Molecules, including dielectric molecules, can be attached to the functionalized surface of the carbon nanotubes 16 to form the coating 20. See Ya-Ping Sun et al., "Functionalized Carbon Nanotubes: Properties and Applications," Acc. Chem. Res. 2002, 35 1096-1104; S. Niyogi et al., "Chemistry of Single-Walled Carbon Nanotubes," Acc. Chem. Res. 2002, 35 1105-1113; Ming Zheng et al., "DNA-assisted dispersion and separation of carbon nanotubes," Nature Materials, 2003, 2, 338); Vasilios Georgakilas et al., "Organic Functionalization of Carbon Nanotubes," J. Am. Chem. Soc., 124, 760 (2002); Alexander Star et al., "Preparation and Properties of Polymer-Wrapped Single-Walled Carbon Nanotubes," Angew. Chem. Int. Ed. 2001, 40, 1721.

The dielectric coating 20, in the case of a functionalized carbon nanotube 16, may, for example, be a non-conductive polymer, but other materials may also be used. If the covalent bonds on the surface of the carbon nanotubes 16 are broken by the functionalizing process, multi-walled carbon nanotubes with high conductivity internal layers may be utilized. Thus, even if surface layer conductivity may be compromised, the inner walls of the multi-walled carbon nanotube are still highly conductive.

Figure 6:
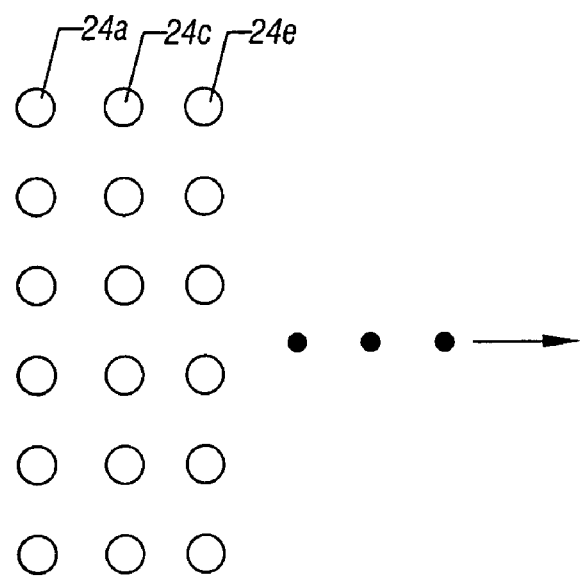
FIG. 6 is a top plan view of one embodiment of the present invention.

In one embodiment, rows 24 of regularly aligned carbon nanotubes, as indicated at 24A, 24C, and 24E, in FIG. 6, are provided. The rows of an identically made substrate 10 with equally spaced rows may be intermeshed or interleaved with the rows 24A, 24C, and 24E to form the desired capacitor, for example, as shown in FIG. 1.

In some embodiments, a conductive paste (not shown) may be used between the two substrates 10 to adhesively secure them in their relative positions. Alternatively, a low dielectric constant adhesive (not shown) may be used between substrates 10.

One of the substrates 10 is coupled to the power supply while the other substrate is coupled to ground or Vss. As a result, a capacitance is created by the array of juxtaposed nanotube structures 22 coupled to each substrate 10.

Figure 7:
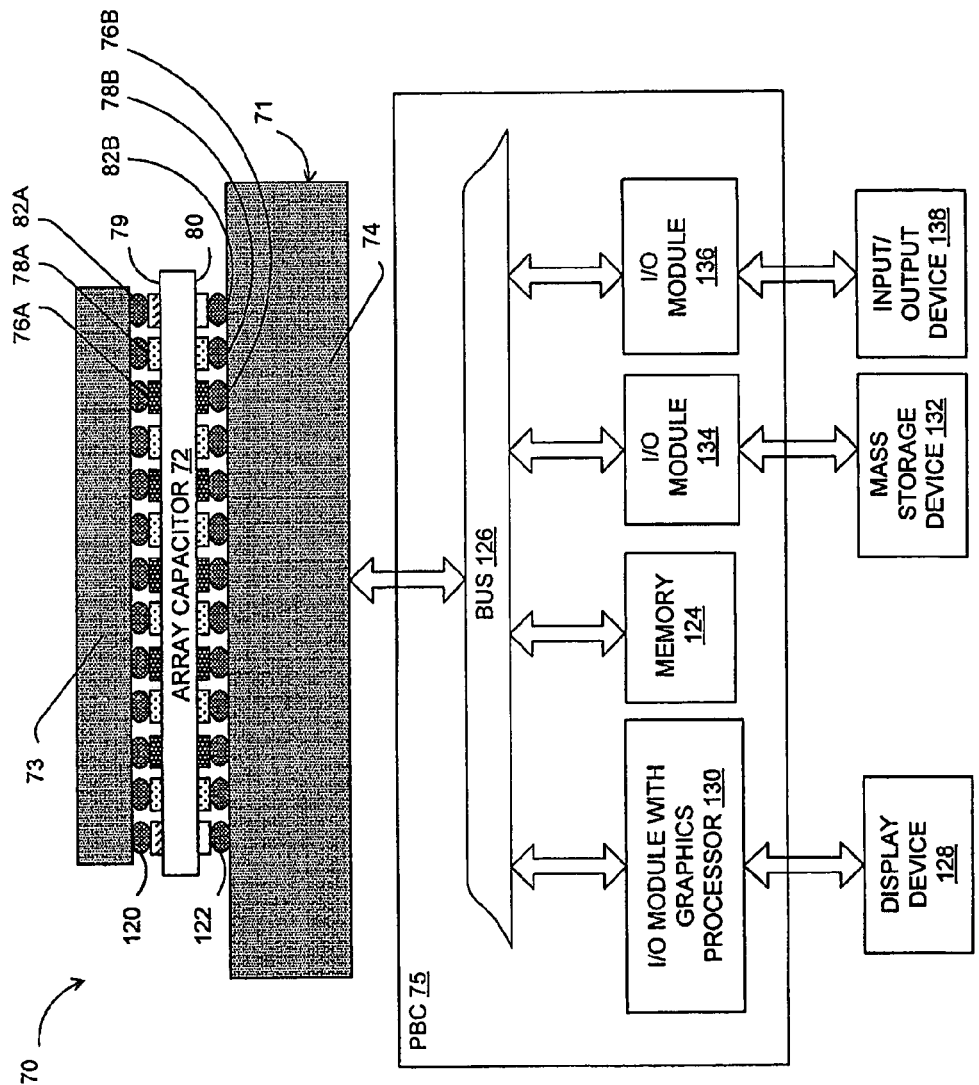
FIG. 7 is a system depiction of one embodiment of the present invention.

In accordance with one application, a carbon nanotube-based capacitor may be utilized to supply power for processor operations as shown in FIG. 7. The capacitor may be used for supplying power in times when extra power is needed. The capacitor may be on the processor die, on the processor packaging, or on a motherboard that mounts the processor, in some embodiments.

A decoupling capacitor may be embedded in an integrated circuit (IC) package adjacent to a die (chip) or included in a capacitor interposer disposed between the IC package and a die. The decoupling capacitor stores charge to provide a stable power supply by decoupling the supply from high frequency noise, damping power overshoots when the die is powered up, and damping power droops when the die begins to use power. High capacitance density is needed in many applications such as for decoupling the power supply for integrated circuits of the die. Inductance between the capacitor and the die slows response time of the capacitor to voltage changes. By embedding the capacitor in close proximity to the die, this inductance may be reduced.

The array capacitor 72 of FIG. 7 may be referred to as an array capacitor for the array of power, ground, and input/output (I/O) contacts. The array capacitor 72 may be embedded in the IC package 71 in a number of different ways. In one embodiment of the IC package 71 (as illustrated in FIG. 7), the array capacitor 72 may be a capacitor interposer wherein the array capacitor 72 is interposed between the die 73 and the chip carrier 74 via solder bumps. In another embodiment of the IC package 71, the array capacitor 72 may be embedded in the chip carrier 74 as layers of the chip carrier 74. In yet another embodiment of the IC package 71, the capacitor array 72 may be modified to have power, ground, and I/O contacts on just one side of the capacitor array and be mounted by solder bumps to the bottom of the chip carrier on the side opposite to the side having the chip. In addition to the embodiments of the IC package 71 incorporating the array capacitor 72, the IC package 71 may incorporate the capacitor 10 of FIG. 1 as a discrete capacitor mounted to or in the chip carrier with one power and one ground terminal. Other locations for an array capacitor 72 or a discrete capacitor of FIG. 1 in the computer system 70 may be used. The capacitor may have electrodes coupled to power and ground so as to function as a decoupling capacitor.

Referring to FIG. 7, the array capacitor 72 may have a plurality of electrical power contacts 76A and 76B on opposed sides that are commonly coupled to one of the substrates 10 of the capacitor 72. The array capacitor 72 may further include a plurality of electrical ground contacts 78A and 78B on opposed sides that are commonly coupled to the other substrate 10 of the array capacitor 72. The power and ground contacts 76A and 78A may be positioned on a chip-side 79 of the array capacitor 72 and power and ground contacts 76B and 78B may be positioned on a carrier-side 80 of the array capacitor 72. The power contacts 76B on the carrier-side 80 may be coupled to a power supply (not shown) via the chip carrier 74 and the printed circuit board (PCB) 75 and the ground contacts 78B on the carrier-side 80 may be coupled to the ground via the chip carrier 74 and the PCB 75. The power and ground contacts 76A and 78A on the chip-side 79 may be coupled to the chip 73. The array capacitor 72 may also have on its opposed sides 79 and 80 a plurality of input/output (I/O) signal contacts 82A and 82B that, in one embodiment, may be solder bumps.

Referring to FIG. 7, the IC chip 73 may be a processor chip and PCB 75 may be a motherboard. In addition to the chip carrier 74, the motherboard PCB 75 may have mounted thereon a main memory 124 and a plurality of input/output (I/O) modules for external device or external buses, all coupled to each other by a bus system 126 on the motherboard PCB 75. More specifically, the system 70 may include a display device 128 coupled to the bus 126 by way of an I/O module 130, with the I/O module 130 having a graphical processor and a memory. The I/O module 130 may be on the PCB 75 as shown in FIG. 7 or on a separate expansion board. The system 70 may further include a mass storage device 132 coupled to the bus 126 via an I/O module 134. Another I/O device 136 may be coupled to the bus 126 via an I/O module 138. Additional I/O modules may be included for other external or peripheral devices or external buses.

Examples of the memory 124 include, but are not limited to, static random access memory (SRAM) and dynamic random access memory (DRAM). Examples of the mass storage device 132 include, but are not limited to, a hard disk drive, a compact disk drive (CD), a digital versatile disk driver (DVD), a floppy diskette, a tape system, and so forth. Examples of the input/output devices 136 may include, but are not limited to, devices suitable for communication with a computer user (e.g., a keyboard, cursor control devices, microphone, a voice recognition device, a display, a printer, speakers, and a scanner) and devices suitable for communications with remote devices over communication networks (e.g., Ethernet interface device, analog, and digital modems, terminal adapters, and frame relay devices). In some cases, these communications devices may also be mounted on the PCB 75. Examples of the bus system 126 include, but are not limited to, a peripheral component interconnect (PCI) bus, and Industry Standard Architecture (ISA) bus, and so forth. The bus system 126 may be implemented as a single bus or as a combination of buses (e.g., system bus with expansion buses). Depending upon the external device, internal interfaces of the I/O modules may use programmed I/O, interrupt-driven I/O, or direct memory access (DMA) techniques for communications over the bus 126. Depending upon the external device, external interfaces of the I/O modules may provide to the external device(s) a point-to-point parallel interface (e.g., Small Computer System Interface—SCSI) or point-to-point serial interface (e.g., EIA-232) or a multipoint serial interface (e.g., FireWire).

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A capacitor comprising:
    a first substrate including a plurality of carbon nanotubes to form a first capacitor plate adapted to be coupled to a first potential; and
    a second substrate including a plurality of carbon nanotubes to form a second capacitor plate, adapted to be coupled to a second potential opposite to the first potential, intermeshed with said nanotubes on the first substrate.

2. The capacitor of claim 1 wherein said first substrate including a plurality of transversely extending carbon nanotubes.

3. The capacitor of claim 2 wherein said nanotubes are dielectric covered.

4. The capacitor of claim 1 wherein said nanotubes are single walled carbon nanotubes.

5. The capacitor of claim 1 wherein said nanotubes are multi-walled carbon nanotubes.

6. The capacitor of claim 1 including transversely extending equally spaced carbon nanotubes on said first and second substrates, said nanotubes on said first and second substrates being parallel.

7. The capacitor of claim 6 wherein each substrate has rows of carbon nanotubes, said rows being regularly spaced from one another.

8. The capacitor of claim 7 wherein the spacing between rows of carbon nanotubes on both substrates is substantially the same.

9. The capacitor of claim 1 including a catalyst between said substrate and said carbon nanotubes.

10. The capacitor of claim 9 including a conductive plug extending through said substrate and contacting said catalyst on one side.

* * * * *